(12) United States Patent
Gaskamp et al.

(10) Patent No.: US 10,076,109 B2
(45) Date of Patent: Sep. 18, 2018

(54) SYSTEMS AND METHODS FOR TRAPPING ANIMALS

(75) Inventors: Joshua Gaskamp, Marietta, OK (US); Kenneth L. Gee, Ardmore, OK (US)

(73) Assignee: Noble Research Institute, LLC, Ardmore, OK (US)

( * ) Notice: Subject to any disclaimer, the term of this patent is extended or adjusted under 35 U.S.C. 154(b) by 107 days.

(21) Appl. No.: 13/396,452

(22) Filed: Feb. 14, 2012

(65) Prior Publication Data
US 2013/0205645 A1    Aug. 15, 2013

(51) Int. Cl.
| | |
|---|---|
| *A01K 23/00* | (2006.01) |
| *A01M 23/16* | (2006.01) |
| *A01M 23/22* | (2006.01) |
| *A01M 31/00* | (2006.01) |

(52) U.S. Cl.
CPC ............ *A01M 23/16* (2013.01); *A01M 23/22* (2013.01); *A01M 31/002* (2013.01)

(58) Field of Classification Search
CPC ...... A01M 23/00; A01M 23/22; A01M 23/20; A01M 23/16
USPC .......................................... 43/58, 60, 61, 62
See application file for complete search history.

(56) References Cited

U.S. PATENT DOCUMENTS

| | | | |
|---|---|---|---|
| 79,686 A | 7/1868 | Rain | |
| 99,537 A * | 2/1870 | Cole | A01M 23/22 43/62 |
| 1,648,160 A | 11/1927 | Boedecker | |
| 5,819,124 A | 10/1998 | Somner et al. | |
| 5,825,431 A | 10/1998 | Walker | |
| 5,845,432 A | 12/1998 | Tully et al. | |
| 5,864,982 A | 2/1999 | Tully et al. | |
| 5,878,283 A | 3/1999 | House et al. | |
| 6,069,655 A | 5/2000 | Seeley et al. | |
| 6,385,772 B1 | 5/2002 | Courtney | |
| 6,438,893 B1 | 8/2002 | DeCorby | |
| 6,449,431 B1 | 9/2002 | Cuddeback et al. | |
| 6,456,320 B2 | 9/2002 | Kuwano et al. | |
| 6,484,436 B1 | 11/2002 | Chang | |

(Continued)

FOREIGN PATENT DOCUMENTS

| | | | |
|---|---|---|---|
| FR | 2663194 | * | 12/1991 |
| WO | WO 2012/155200 | | 11/2012 |

OTHER PUBLICATIONS

Translation of FR 2663194.*

(Continued)

*Primary Examiner* — Thanh T Pham
(74) *Attorney, Agent, or Firm* — Dentons US LLP

(57) ABSTRACT

A system for trapping animals includes a cable and an enclosure adapted to be suspended above a trap area by the cable. A release mechanism includes a pivotable member, and the pivotable member is configured to rotate about a pivot support between an engaged position and a released position. The pivotable member in the engaged position supports the cable to hold the enclosure in a suspended position, and the pivotable member in the released position releases the cable to allow the enclosure to fall from the suspended position and enclose the trap area. The system further includes an actuator, which in an extended position holds the pivotable member in the engaged position. In a retracted position, the actuator releases the pivotable member to allow the pivotable member to rotate into the released position.

23 Claims, 9 Drawing Sheets

(56) References Cited

U.S. PATENT DOCUMENTS

| | | | |
|---|---|---|---|
| 6,539,663 B2 | 4/2003 | Mosher | |
| 6,658,788 B1 | 12/2003 | Steinfest | |
| 6,678,413 B1 | 1/2004 | Liang et al. | |
| 6,732,471 B2 | 5/2004 | Draper | |
| 6,735,387 B1 | 5/2004 | Schnell | |
| 6,768,868 B1 | 7/2004 | Schnell | |
| 6,775,946 B2 | 8/2004 | Wright | |
| 6,834,162 B1 | 12/2004 | Schnell | |
| 6,930,709 B1 | 8/2005 | Creamer et al. | |
| 7,023,469 B1 | 4/2006 | Olson | |
| 7,051,472 B1 | 5/2006 | Kelly | |
| 7,149,422 B2 | 12/2006 | Schnell | |
| 7,301,456 B2 | 11/2007 | Han | |
| 7,246,196 B2 | 12/2007 | Schnell | |
| 7,308,196 B2 | 12/2007 | Schnell | |
| 7,310,111 B2 | 12/2007 | Ramirez-Diaz et al. | |
| 7,339,607 B2 | 3/2008 | Damabhorn | |
| 7,398,617 B2 * | 7/2008 | Mattox | 43/58 |
| 7,425,987 B2 | 9/2008 | Creamer et al. | |
| 7,428,005 B2 | 9/2008 | Creamer et al. | |
| 7,463,145 B2 | 12/2008 | Jentoft | |
| 7,465,108 B2 | 12/2008 | Brown | |
| 7,465,145 B2 | 12/2008 | Kane | |
| 7,471,334 B1 | 12/2008 | Stenger | |
| 7,486,183 B2 | 2/2009 | Luebke et al. | |
| 7,523,480 B2 | 4/2009 | Creamer et al. | |
| 7,534,056 B2 | 5/2009 | Cross et al. | |
| 7,593,632 B2 | 9/2009 | Schnell | |
| 7,643,056 B2 | 1/2010 | Silsby | |
| RE41,103 E | 2/2010 | Barraclough et al. | |
| 7,657,914 B2 | 2/2010 | Whelan et al. | |
| 7,697,927 B1 | 4/2010 | Owens | |
| 7,702,135 B2 | 4/2010 | Hill et al. | |
| 7,710,457 B2 | 5/2010 | Schnell | |
| 7,817,914 B2 | 10/2010 | Kuberka et al. | |
| D628,224 S | 11/2010 | Barley et al. | |
| D628,614 S | 12/2010 | Barley et al. | |
| 7,854,088 B2 | 12/2010 | Kurachi | |
| 7,861,676 B2 | 1/2011 | Kates | |
| 7,873,266 B2 | 1/2011 | Schnell et al. | |
| 7,930,853 B2 | 4/2011 | Pomerantz | |
| 8,010,631 B2 | 8/2011 | Brailean et al. | |
| 8,022,367 B2 | 9/2011 | Finch et al. | |
| 8,081,073 B2 | 12/2011 | Reibel et al. | |
| 8,096,078 B2 | 1/2012 | Watson | |
| 8,112,934 B2 | 2/2012 | Alter et al. | |
| 8,155,105 B2 | 4/2012 | Reibel et al. | |
| 8,254,776 B2 | 8/2012 | Schnell | |
| 8,350,915 B2 | 1/2013 | Schnell | |
| 8,359,783 B1 | 1/2013 | Kamery et al. | |
| 8,407,930 B2 | 4/2013 | DeKalb | |
| 8,413,368 B2 | 4/2013 | DeKalb | |
| 8,416,299 B2 | 4/2013 | Moore | |
| 8,418,396 B2 | 4/2013 | Moustirats | |
| 8,421,861 B2 | 4/2013 | Barley et al. | |
| 8,451,333 B2 | 5/2013 | Sandler et al. | |
| 8,480,316 B2 | 7/2013 | Smith | |
| 8,493,454 B1 | 7/2013 | Kohn et al. | |
| 9,237,743 B2 | 1/2016 | Gaskamp et al. | |
| 9,706,756 B2 | 7/2017 | Swan | |
| 2002/0030163 A1 | 3/2002 | Zhang | |
| 2003/0014902 A1 | 1/2003 | Draper | |
| 2003/0213161 A1 * | 11/2003 | Gardner et al. | 43/61 |
| 2004/0057567 A1 | 3/2004 | Lee | |
| 2004/0233282 A1 | 11/2004 | Stavely et al. | |
| 2004/0233284 A1 | 11/2004 | Lesesky et al. | |
| 2005/0104958 A1 | 5/2005 | Egnal et al. | |
| 2005/0280704 A1 | 12/2005 | Clare et al. | |
| 2005/0285941 A1 | 12/2005 | Haigh et al. | |
| 2006/0042153 A1 | 3/2006 | Bowerman | |
| 2006/0069463 A1 | 3/2006 | Kim | |
| 2006/0152594 A1 | 7/2006 | Landschaft et al. | |
| 2007/0028279 A1 | 2/2007 | Kim | |
| 2007/0036535 A1 | 2/2007 | Chee | |
| 2007/0127908 A1 | 6/2007 | Oon et al. | |
| 2007/0131005 A1 | 6/2007 | Clare | |
| 2007/0248219 A1 | 10/2007 | Foster et al. | |
| 2007/0252693 A1 | 11/2007 | Janson | |
| 2008/0084787 A1 * | 4/2008 | Graber | A01M 29/16 367/96 |
| 2008/0122929 A1 | 5/2008 | Chukwu | |
| 2008/0134564 A1 * | 6/2008 | Tseng | A01K 85/01 43/17 |
| 2008/0151050 A1 | 6/2008 | Self | |
| 2008/0151056 A1 | 6/2008 | Ahamefula | |
| 2008/0158358 A1 | 7/2008 | Chanson et al. | |
| 2008/0231714 A1 | 9/2008 | Estevez et al. | |
| 2008/0236023 A1 * | 10/2008 | Thomas et al. | 43/58 |
| 2008/0259161 A1 | 10/2008 | Hellman et al. | |
| 2009/0051484 A1 | 2/2009 | Foster et al. | |
| 2009/0094882 A1 | 4/2009 | Comstock | |
| 2009/0151221 A1 | 6/2009 | Daley | |
| 2009/0237509 A1 | 9/2009 | Saxon | |
| 2011/0025846 A1 | 2/2011 | Garrett | |
| 2011/0088625 A1 * | 4/2011 | Nowacek | A01K 5/02 119/51.02 |
| 2011/0102588 A1 | 5/2011 | Trundle et al. | |
| 2011/0167709 A1 * | 7/2011 | Pinkston | 43/61 |
| 2011/0308137 A1 * | 12/2011 | Ugiansky | 43/62 |
| 2012/0075468 A1 | 3/2012 | Wu et al. | |
| 2012/0086547 A1 | 4/2012 | Foster et al. | |
| 2012/0113253 A1 | 5/2012 | Slater | |
| 2012/0188345 A1 | 7/2012 | Salow | |
| 2012/0212582 A1 | 8/2012 | Deutsch | |
| 2012/0327225 A1 | 12/2012 | Barley et al. | |
| 2012/0327242 A1 | 12/2012 | Barley et al. | |
| 2013/0010109 A1 | 1/2013 | Chen et al. | |
| 2013/0031824 A1 | 2/2013 | Arlichson | |
| 2013/0081322 A1 | 4/2013 | Baumert | |
| 2013/0081323 A1 * | 4/2013 | Alfarhan | 43/62 |
| 2013/0124847 A1 | 5/2013 | Fried et al. | |
| 2013/0167428 A1 * | 7/2013 | Alhuwaishel | 43/102 |
| 2013/0174469 A1 | 7/2013 | Kittelson | |
| 2013/0188047 A1 | 7/2013 | Slevin et al. | |
| 2013/0205645 A1 | 8/2013 | Gaskamp et al. | |
| 2013/0215266 A1 | 8/2013 | Trundle et al. | |
| 2013/0222581 A1 | 8/2013 | Wydner et al. | |
| 2013/0229515 A1 | 9/2013 | Barley et al. | |
| 2013/0236049 A1 | 9/2013 | Jung et al. | |
| 2013/0245881 A1 | 9/2013 | Scarbrough | |
| 2013/0265440 A1 | 10/2013 | Mizuta | |
| 2014/0168430 A1 | 6/2014 | Unger | |
| 2015/0077551 A1 | 3/2015 | Simeroth et al. | |
| 2015/0296766 A1 | 10/2015 | Gaskamp et al. | |
| 2016/0050903 A1 | 2/2016 | Gaskamp et al. | |
| 2016/0262355 A1 | 9/2016 | Swan | |
| 2016/0277688 A1 | 9/2016 | Gaskamp et al. | |

OTHER PUBLICATIONS

Stevens, "The feral hog in Oklahoma," Second Edition, The Samuel Roberts Noble Foundation, Agricultural Division, 2010.

Gee et al., "The Noble Foundation drop-net system for capturing white-tailed deer—the next generation," Abstracts of the $22^{nd}$ Annual Southeast Deer Study Group, 1999.

U.S. Appl. No. 14/256,614, filed Apr. 18, 2014, Gaskamp et al.

U.S. Appl. No. 14/927,251, filed Oct. 29, 2015, Gaskamp et al.

USPTO: Notice of Allowance regarding U.S. Appl. No. 14/256,614, dated Oct. 19, 2015.

Cabela's, "Cabela's Outfitter Series Trail Cameras," available at <http://www.cabelas.com/category/Cabelas-Outfitter-Series-Trail-Cameras/328647780.uts>, accessed Jun. 29, 2015.

Cabela's, image of "Cabela's Outfitter Series Trail Cameras," from Cabela's catalogue, image creation date Feb. 10, 2014.

Trailcampro.com, "2013 Trail Camera Detection Zone Test," available at <http://www.trailcampro.com/detectionzonetest.aspx>, accessed Jun. 29, 2015.

USPTO: Non-Final Office Action regarding U.S. Appl. No. 14/927,251, dated Jul. 21, 2016.

Higginbotham, "Training Wild Pigs to Bait," available at http://feralhogs.tamu.edu/files/2010/04/Training-Wild-Pigs-to-Bait.pdf, dated Apr. 2010.

(56) References Cited

OTHER PUBLICATIONS

Higginbotham, "Chumming for Hogs," available at http://feralhogs.tamu.edu/files/2011/05/Chumming-for-Hogs.pdf, dated May 2011.
*Purdue Pharma L.P.* v. *Depomed, Inc.*, No. 2015-2029 (CAFC Mar. 24, 2016), available at www.cafc.uscourts.gov/sites/default/files/opinions-orders/15-2029.Opinion.3-22-2016.1.PDF.
USPTO: Non-Final Office Action regarding U.S. Appl. No. 14/927,251, dated Dec. 9, 2016.
USPTO: Notice of Allowance regarding U.S. Appl. No. 14/927,251, dated Feb. 3, 2017.
USPTO: Non-Final Office Action regarding U.S. Appl. No. 14/661,812, dated Nov. 16, 2017.
U.S. Appl. No. 15/934,782, filed Mar. 23, 2018, Gaskamp et al.
Response to Non-Final Office Action regarding U.S. Appl. No. 14/661,812, dated May 14, 2018.

* cited by examiner

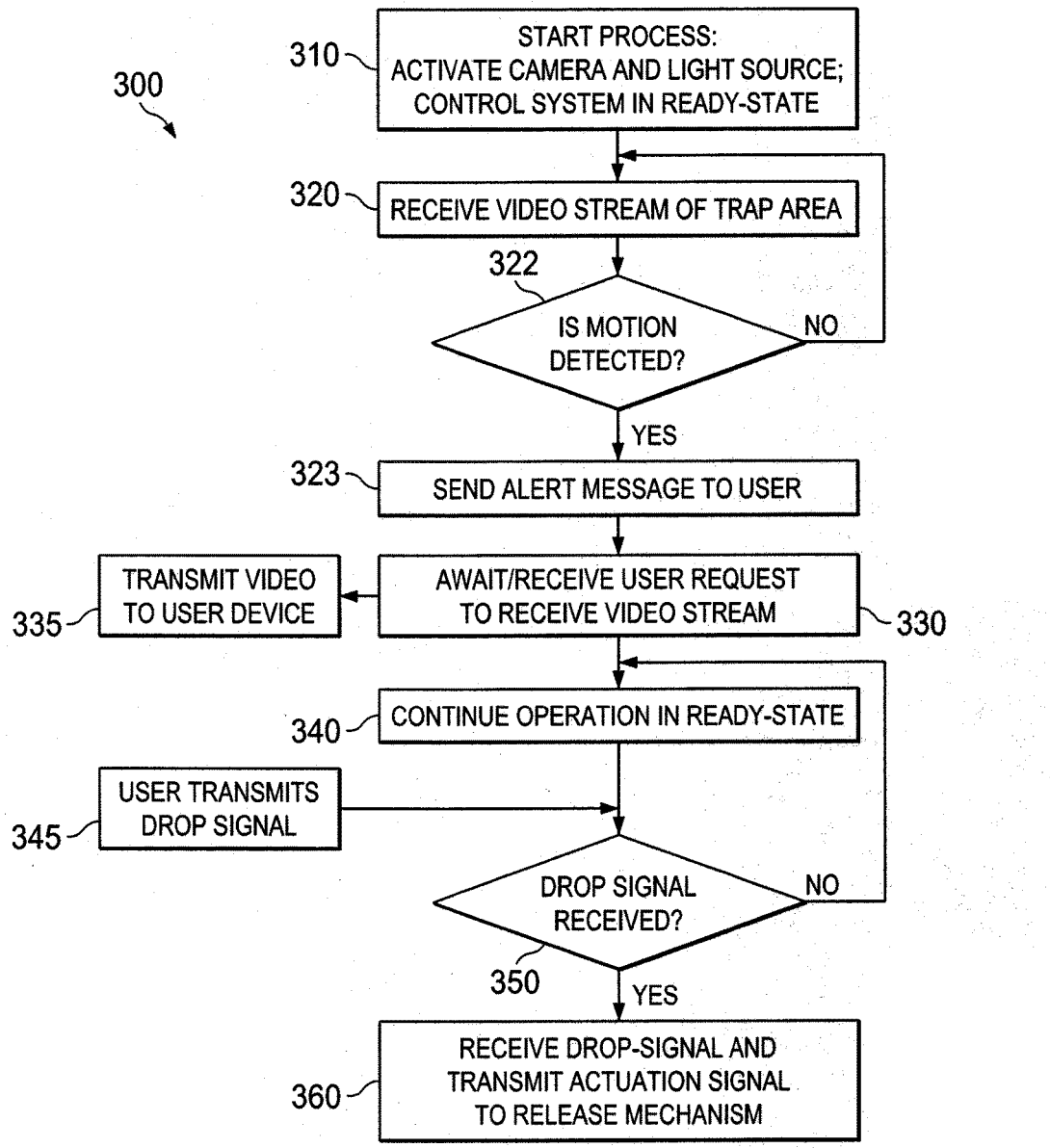

SYSTEMS AND METHODS FOR TRAPPING ANIMALS

BACKGROUND

1. Field of the Invention

The present disclosure relates generally to systems and methods for trapping wild animals.

2. Description of Related Art

Overpopulation of wild animals, such as feral hogs, can be problematic in a number of ways. Feral hogs may damage trees, vegetation, agricultural interests, and other property. According to a 2008 New York time article, the extent of property damage associated with feral hogs is estimated to be as high as $800 million annually in the United States alone. In addition, feral hogs may prey on domestic animals such as pets and livestock, and may injure other animal populations by feeding on them, destroying their habitat, and spreading disease.

The size and number of feral hogs in the United Sates contribute to their ability to bring about such destruction. Mature feral hogs may be as tall as 36 inches and weigh from 100 to 400 lbs. Feral hog populations are also staggering. A recent publication by the Samuel Roberts Noble Foundation of Ardmore, Okla. estimated there were between 617,000 and 1.4 million feral hogs in Oklahoma in 2007. Similarly, the Texas Parks and Wildlife Department estimates that there are more than 1.5 million feral hogs in Texas, citing the animals' limited number of natural predators and high reproductive potential as underlying factors for the large population. Sows can produce up to ten piglets per litter and may produce two litters per year and the piglets reach sexual maturity at six months of age, underscoring the animals' ability to quickly reach a state of overpopulation.

Because feral hogs are so numerous and have virtually no natural predators, in some areas it is desirable to artificially control their populations by trapping them. Yet feral hogs are relatively intelligent animals that have keen senses of hearing and smell and quickly become suspicious of traps. In addition to being difficult to trap, the hogs' bulk and strength may render many traps unsuitable for capturing and holding multiple hogs.

SUMMARY

The problems presented by animal traps are solved by the systems and methods described herein. In one illustrative embodiment, a system for trapping animals includes a cable and an enclosure adapted to be suspended above a trap area by the cable. The system further includes a release mechanism comprising a pivotable member having a first leg and a second leg. The pivotable member is configured to rotate about a pivot support between an engaged position and a released position. The pivotable member in the engaged position supports the cable to hold the enclosure in a suspended position, and the pivotable member in the released position releases the cable to allow the enclosure to fall from the suspended position and enclose the trap area. The system further includes an actuator having an extended position and a retracted position. The actuator in the extended position holds the pivotable member in the engaged position. In the retracted position, the actuator releases the pivotable member to allow the pivotable member to rotate into the released position.

In another illustrative embodiment, a system for trapping animals includes a support structure and an enclosure slidingly coupled to the support structure to allow the enclosure to move between a suspended position and a lowered position. A release mechanism is operably coupled to the enclosure and configured to hold the enclosure in the suspended position when the release mechanism is engaged. The release mechanism is configured to drop the enclosure to the lowered position when the release mechanism is released. The system further includes a camera to allow a user to view a trap area beneath the enclosure. A control system is operably coupled to the release mechanism to allow the user to release the release mechanism thereby dropping the enclosure.

In yet another illustrative embodiment, a method for capturing animals includes suspending an enclosure above a trap area. The trap area is monitored from a remote location. The method further includes transmitting a drop signal from the remote location to drop the enclosure.

Other features and advantages of the illustrative embodiments will become apparent with reference to the drawings and detailed description that follow.

BRIEF DESCRIPTION OF THE DRAWINGS

FIG. 8 is a flow chart showing a process for monitoring and actuating the trap system of FIG. 1.

DETAILED DESCRIPTION OF ILLUSTRATIVE EMBODIMENTS

Figure 1:
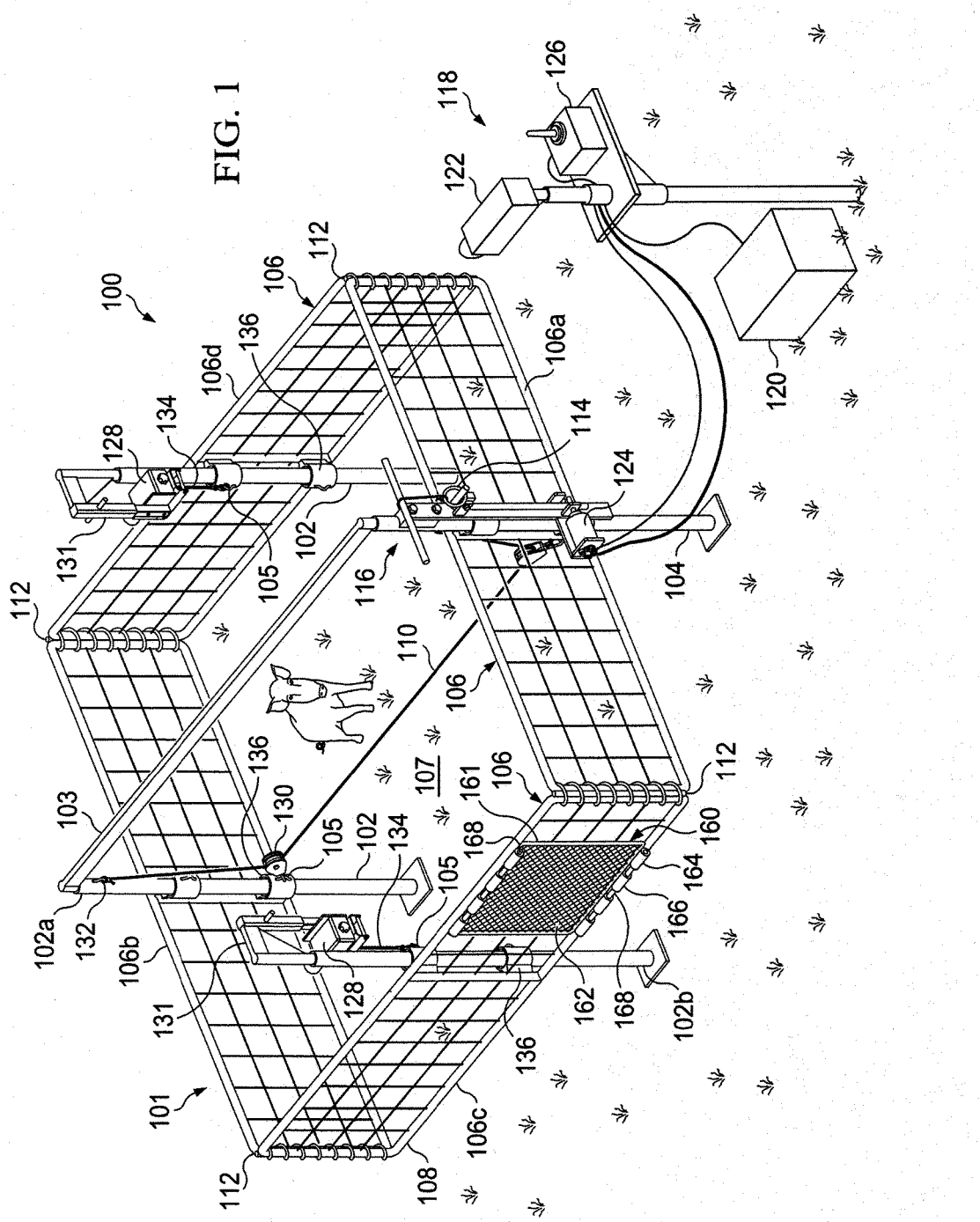
FIG. 1 is a perspective view of an illustrative embodiment of a system for trapping wild animals.

In the following detailed description of the illustrative, non-limiting embodiments, reference is made to the accompanying drawings that form a part hereof. These illustrative embodiments are described in sufficient detail to enable those skilled in the art to practice the invention. It is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is not to be taken in a limiting sense, and the scope of the illustrative embodiments is defined only by the appended claims.

It will be understood that the benefits and advantages described above may relate to one embodiment or may relate to several embodiments. It will further be understood that reference to "an" item may refer to one or more of those items.

Feral hogs or other wild animals may quickly learn to recognize and avoid traps. Typically, the hogs may recognize traps by observing structural elements of the trap, such as panels, posts, or gates that are at or near the animals' eye level. The innate suspiciousness of feral hogs, for example, makes it difficult to capture an entire group of hogs, i.e., a sounder of hogs, which in turn makes it difficult to make any meaningful reduction in their population. Further, feral hogs are often large and powerful animals that are capable of destroying or escaping from some traps. There is a need for a trap that does not trigger the suspicions of the hogs, yet is large enough and robust enough to catch and hold large numbers of hogs.

A trap system is described below that is suspended above the line-of-sight of, for example, feral hogs, to avoid triggering the animals' suspicions. The trap system includes a robust, rigid enclosure that can be raised to a suspended position over a trap area and supported by one or more support members. To set the trap system, a user places bait within the trap area and raises the enclosure to the suspended position. After raising the enclosure to the suspended position, the user releasably couples the enclosure to a release mechanism. The release mechanism holds the enclosure in the suspended position until the user actuates the trap system, thereby dropping the enclosure.

The user may monitor and actuate the trap system using a control system. The control system includes a camera and communications system to transmit a video feed of the trap area to the user. The control system allows the user to monitor the trap area from a remote, comfortable location where the user may patiently wait until a desired number of animals have entered the trap area. When the user determines that the desired number of animals have entered the trap area, the user communicates a drop signal to the control system using a computer or wireless device. The control system actuates the release mechanism in response to receiving the drop signal, causing the release mechanism to release the enclosure. The released enclosure quickly drops to the ground, trapping the animals in the trap area within the enclosure. The enclosure has a robust construction to resist the animals' attempts to escape until the user returns to remove the animals in a controlled manner.

Referring now to the illustrative embodiments of FIGS. 1-6, a trap system 100 includes an enclosure 101 that is slidably engaged to a plurality of support members 102, which includes a base support 104. The enclosure 101 is releasably coupled to a release mechanism 116 that is coupled to the base support 104 and controlled using a control system 118. The trap system 100 also includes a cross-brace 103 that engages the base support 104 and a first support member 102a to provide lateral rigidity to trap system 100. In one embodiment, the release mechanism 116 includes a solenoid 124 that actuates the release mechanism 116 in response to a signal received from a control system 118. The control system 118 includes a battery 120 that supplies power to a communications system 126, including a camera 122 and a transceiver that transmits images to allow a user to monitor the trap area 107. The transceiver may also enable a user to remotely actuate the trap system 100 using a remote electronic device such as a telephone (e.g. smart phone), computer, or other electronic communications device.

In one embodiment, the enclosure 101 is a corral-type enclosure having four panels 106. The panels 106 are rigid panels that include frames constructed from structural framing materials. Many types of framing members could be used including without limitation rod, pipe, tubing, or L-shaped, C-shaped, or U-shaped channels, or any other suitable framing stock. The type of materials chosen may also vary, although in one embodiment, it may be advantageous to use steel because of the widespread availability of the material and the ease with which structural members may be joined by processes such as welding. Alternatively, it may be desirable to use aluminum or other metals as the material of choice for the framing members. Still other options may include structural plastics, fiberglass, or composites. The panels 106 may further include heavy-gauge wire mesh 141 that is supported by the framing members of the panels. While the embodiment of FIG. 1 shows a four-sided rectangular enclosure 101, the enclosure 101 may be circular, triangular, hexagonal, or any other shape. The enclosure 101 may be constructed from multiple panels or a single rigid frame. The enclosure 101 is configured to be dropped from a height (h), and as such is suspendable from one or more suspension points 105 before it is dropped to the ground.

Figure 2:
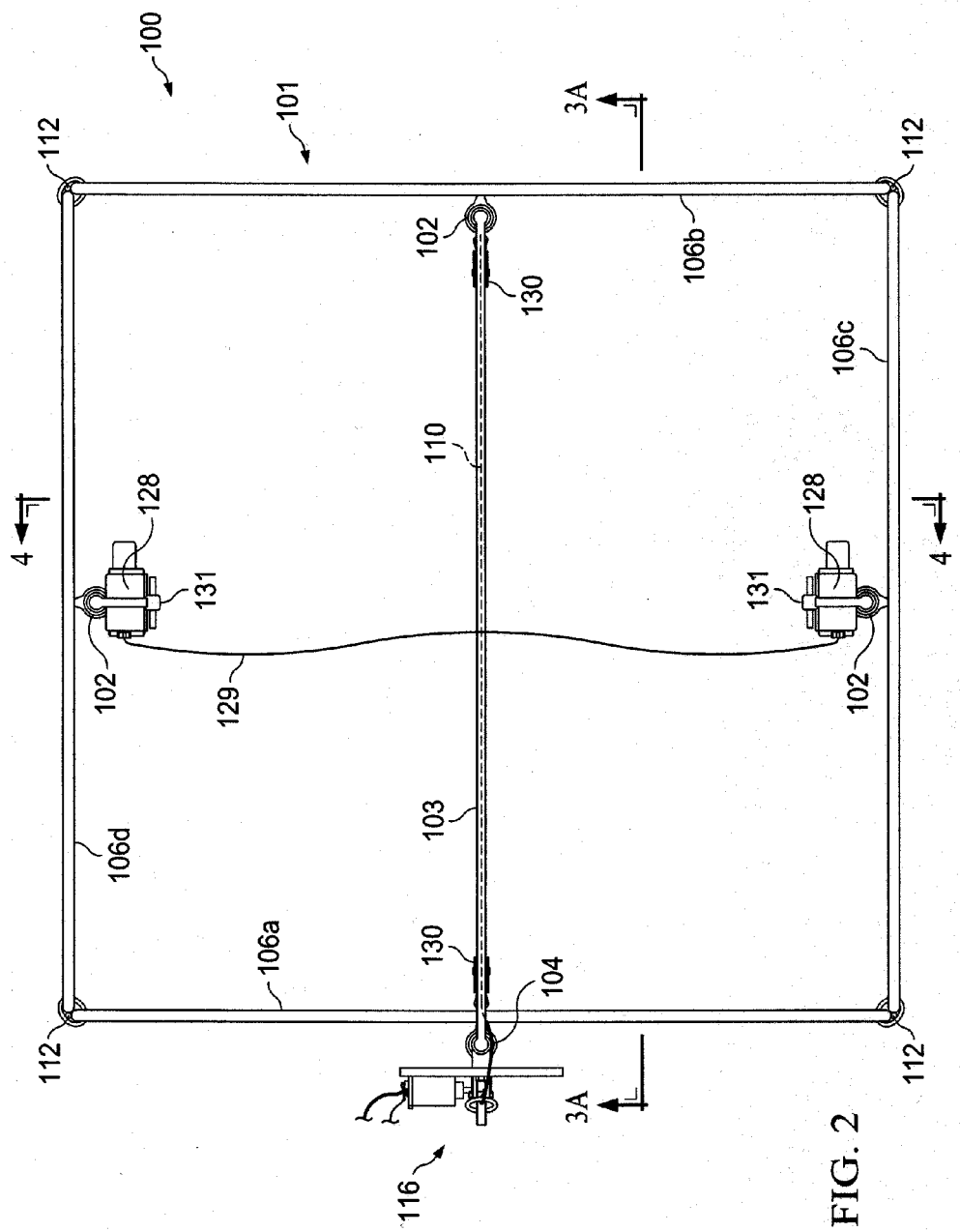
FIG. 2 is a top view of the system of FIG. 1.

The four-sided enclosure 101 of FIG. 1 is formed by four panels 106. The enclosure is constructed so that a first panel 106a slidably engages the base support 104. A second panel 106b, third panel 106c, and fourth panel 106d slidably engage a first support member 102a, second support member 102b, and third support member 102c, respectively. As shown in FIGS. 1 and 2, each of the panels 106 is coupled to another panel 106 at each end to form the four-sided enclosure 101. The first panel 106a is coupled at one end to the third panel 106c and at the other end to the fourth panel 106d. On the opposite side of the enclosure 101 from the first panel 106a, the second panel 106b is coupled to the third panel 106c at one end and to the fourth panel 106d at the other end to complete the enclosure 101.

Couplings 112 at the ends of the panels 106 form the corners of the enclosure 101. Each coupling 112 may include, for example, a corner pin or binding. Where the coupling 112 includes a binding, the ends of the panels 106 may be wrapped with a cable or rope to reinforce and hold the ends of the panels 106 together without the need for an additional fixed joint. Where the coupling 112 includes a pin, each end of each panel 106 may include a sleeve that receives a steel rod or pin to form a coupling 112 that is similar to an interlocking door hinge.

Figure 5:
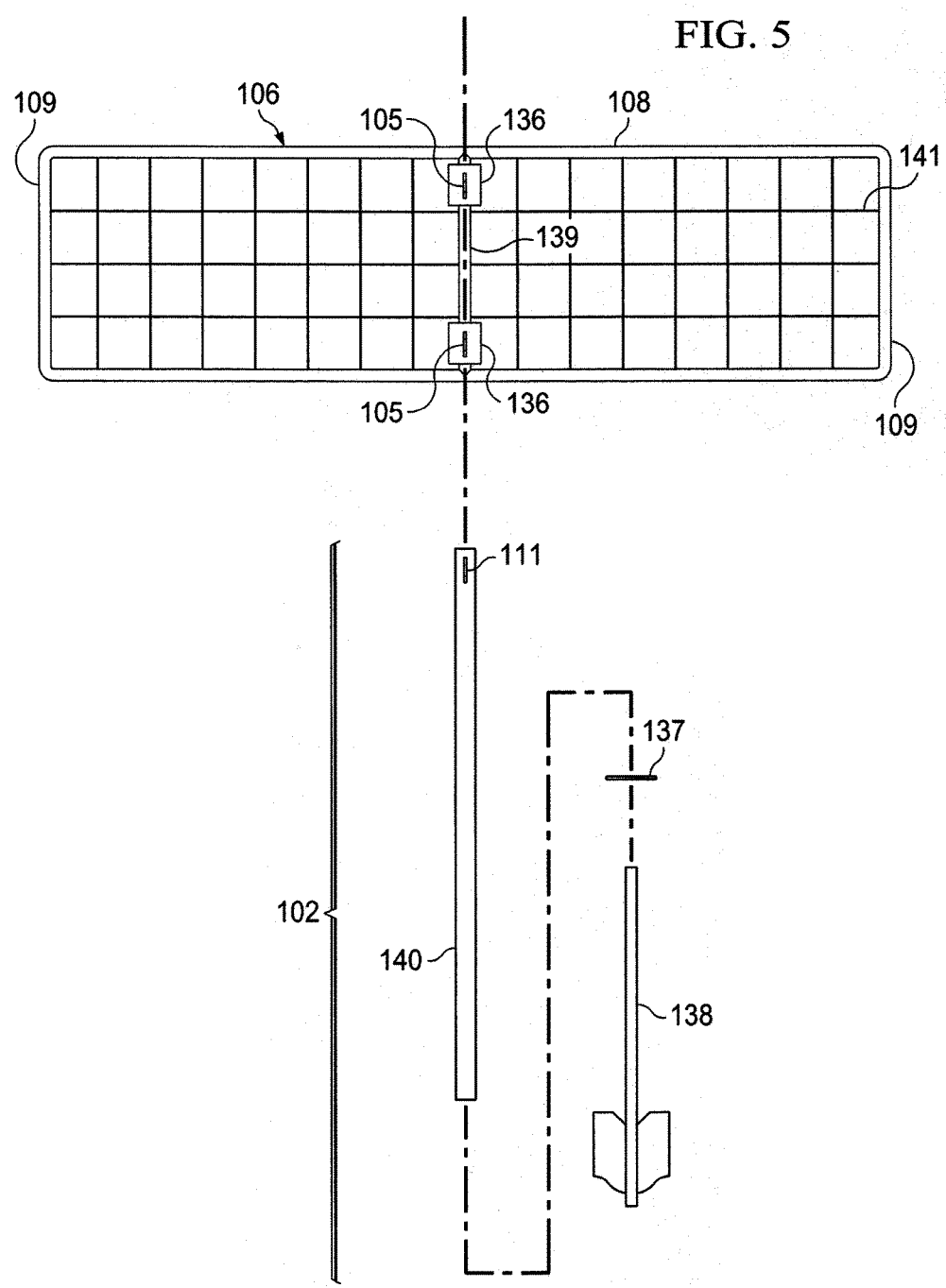
FIG. 5 is an exploded view of a panel of the system of FIG. 1, along with a support structure.

Referring more specifically to FIG. 5, each panel 106 may be formed by coupling two horizontal members 108 to two vertical members 109 to form a rigid, rectangular frame. The horizontal members 108 and vertical members 109 may be formed from any suitable material (including those listed previously), such as ¾ inch steel pipe or rod that is welded together at the ends to form the rectangular frame. The center of the panel 106 includes a center vertical member 139 formed from, for example, 1"×2" steel channel that is welded to the horizontal members 108. Within the frame formed by the horizontal members 108 and vertical members 109, the panel 106 includes a mesh 141, such as heavy-gauge, four-inch steel mesh that is also welded to the horizontal members 108 and vertical members 109.

In an embodiment, one or more of the panels 106 includes a door 160 that also functions as a loading ramp to remove animals that have been captured using the trap system 100. The door 160 shown in FIG. 3B includes a door frame 161 that is formed from welded steel, e.g., steel rods. The top and bottom of the door 160 include small sleeves 166 that form a portion of a hinge or coupling by interlocking with complementary small sleeves 164 that are mounted to the panel 106 on which the door 160 is installed. A pin 168 is inserted in the small sleeves 166 and complementary small sleeves 164 to form a hinge or coupling. For example, at the bottom of the door 160, the pin 168 may be installed to form a hinge that allows the door 160 to open and function as an exit point and a loading ramp to evacuate trapped animals. At the top of the door 160, the pin 168 may be temporarily installed to form a coupling that secures the door 160 in the panel 106 until the pin 168 is removed by a user to open the door 160. To facilitate use of the door 160 as a loading ramp, the door 160 includes a panel 162 that is suitable to form a walking surface for the trapped animals. The panel 162 may be formed from, for example, a steel grating, panel, or other type of expanded metal.

Each panel 106 further may include sleeves 136 to slidably engage one of the support members 102 or base support 104. One or more sleeves 136 may be formed from steel pipe and welded to the top, bottom, or middle of the center vertical member 139. One or more of the sleeves 136 includes a suspension point 105. The suspension points 105 illustrated in FIGS. 1 and 3A-6 are eyelets that are welded to each sleeve 136 to enable a rope, cable, latch, clip, or similar component to attach to the panel 106. The suspension points 105 may also slidingly receive a cable or other flexible line to allow proper suspension and release of the enclosure 101 as described herein. In another embodiment, the suspension points 105 may comprise bolt holes, eye bolts, rigid pulley mounts, or similar features.

Functionally, the sleeves 136 of each panel 106 are configured to slidably engage, or slide up and down, a support member 102 or the base support 104 so that the enclosure 101 can be raised to a suspended position and dropped to the ground. To facilitate slidable engagement between the panels 106 and the support members 102 or base support 104, the sleeves 136 of each panel 106 are aligned to share a common axis that may be, parallel to the center vertical member 139 during construction of the panel 106.

When the trap system 100 is assembled, the sleeves 136 of the panels 106 that form the enclosure 101 slidably engage the base support 104 or support members 102, which are arranged at the trap area 107. In one embodiment, the sleeves 136 of the first panel 106a slidably engage the base support 104 and the sleeves of the remaining panels 106b-d slidably engage the three support members 102a-c, respectively.

In the illustrative embodiment of FIG. 5, each support member 102 is formed by an anchored member 138 that is configured to be anchored in the ground and an unanchored member 140 that fits over the anchored member 138. In one embodiment, the unanchored member 140 is steel pipe that slides over the anchored member 138, which is steel T-bar that is implantable into the ground around the trap area 107. The unanchored member 140 is sized relative to the anchored member 138 and sleeves 136 of the panels 106 such that the unanchored member 140 fits over the anchored member while allowing the sleeves 136 to slide up and down the unanchored member 140 without binding. As such, the unanchored member 140 has an outer diameter that is slightly less than the inner diameter of the sleeves 136 and an inner diameter that is slightly larger than the width of the anchored member 138. While the embodiment of FIG. 5 includes an unanchored member 140 and sleeves 136 that are round, other embodiments may include an unanchored member 140 and sleeves 136 of other shapes, such as shapes that are rectangular or oval in cross section. In one embodiment, a plate 137, such as a four-inch by four-inch steel plate with a hole in the middle may be installed over the anchored member 138 before the installation of the unanchored member 140. The plate 137 prevents the unanchored member 140 from sinking into the ground and enables the trap system 107 to remain level.

While the support members 102 have been described herein as being anchored to a surface of the ground using a multiple components (i.e. one that is driven into the ground and a second that is positioned over the first), each support member 102 may instead be a unitary rod, pipe, or other piece of material that is driven into the ground. Alternatively, the support members 102 may be provided be positioned directly on the ground surface without driving any portion of the surface members 102 into the ground surface. In this embodiment, a heavier base may be provide for each support member 102 to assist in stabilizing the non-driven surface member 102.

The construction of the base support 104 is similar to the construction of the support members 102. The base support 104 and support members 102 are arranged about the trap area 107 to provide strength and rigidity to the trap system 100 and to establish parallel axes of movement for each panel 106 of the enclosure 101. In the embodiment of FIGS. 1-4, the base support 104 supports the first panel 106a, the first support member 102a supports the second panel 106b, the second support member 102b supports the third panel 106c, and the third support member 102c supports the fourth panel 106d. The cross-brace 103 couples the base support 104 to the first support member 102a and provides lateral rigidity to the trap system 100 by preventing the base support 104 and first panel 106a from being pulled toward the first support member 102a and second panel 106b.

As described above, the enclosure 101, base support 104, and support members 102 are installed at the trap area 107 so that the enclosure can be raised and suspended above the trap area 107. To raise the enclosure 101 into the suspended position, a winch 128 may be mounted at the top of one of the support members 102 and coupled to one of the panels 106. For example, in FIGS. 1, 2 and 4, the trap system 100 includes two winches 128 mounted to winch mounts 131 atop the second support member 102b and third support member 102c. The winch 128 atop the second support member 102b is coupled to the third panel 106c by a winch cable 134 and the winch 128 atop the third support member 102c is similarly coupled to the fourth panel 106d. The winches 128 may be electrically or mechanically coupled by a wire 129 that synchronizes the controls of the winches 128 so that the winches 128 will function in unison. This synchronization allows the enclosure 101 to be raised into a suspended position without inducing movement in any of the panels 106 in a direction that is not parallel to the base support 104 and support members 102. In another embodiment (not shown), a single winch 128 may be mounted to a winch mount 131 affixed to the cross brace 103 and a single winch cable may be routed through pulleys 130 to raise the enclosure 101 to the suspended position.

Figure 3A:
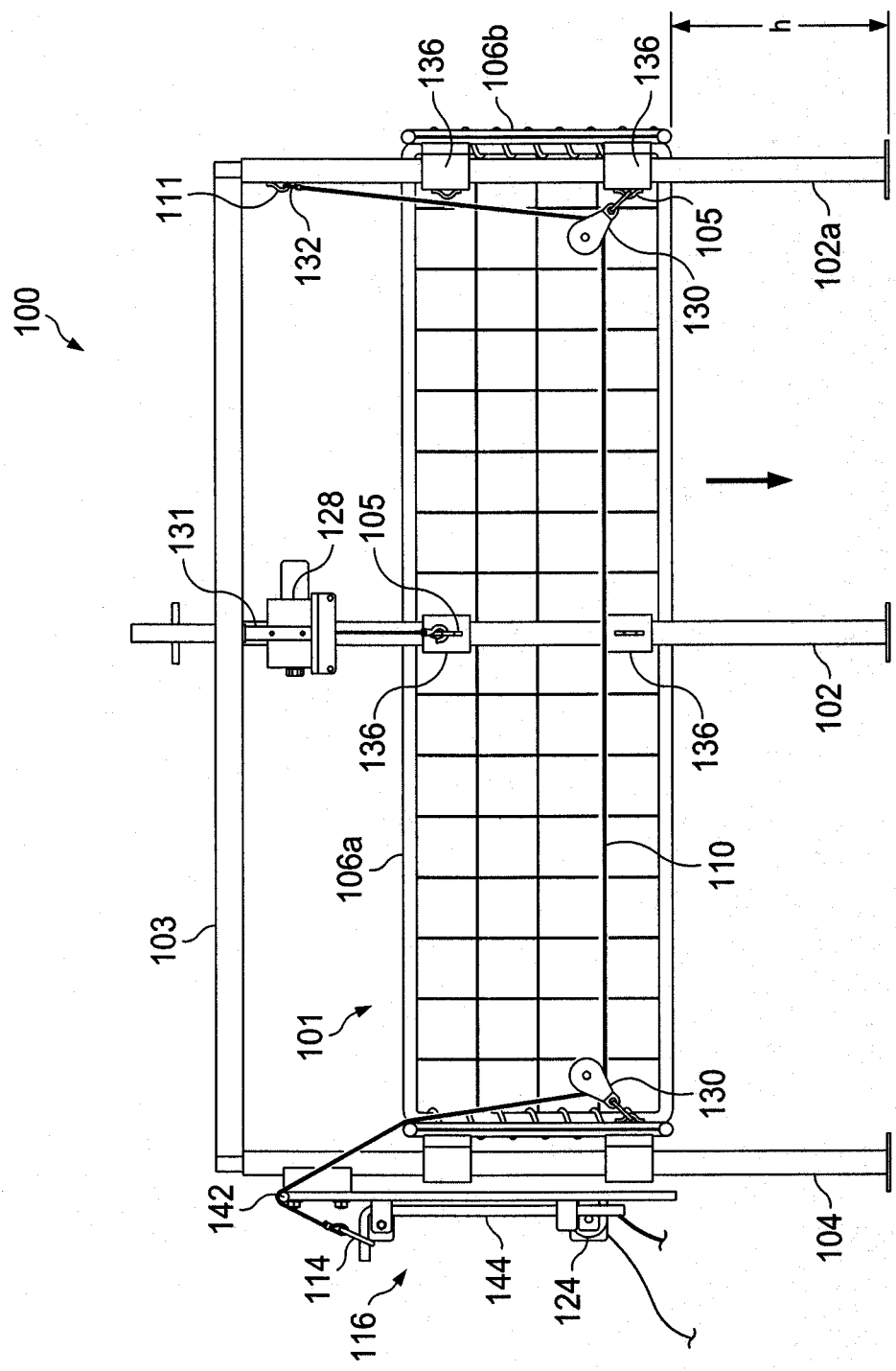
FIG. 3A is a cross-sectional side view of the system of FIG. 1, taken along the lines 3A-3A of FIG. 2, which shows an enclosure of the system in a suspended position.
Figure 4:
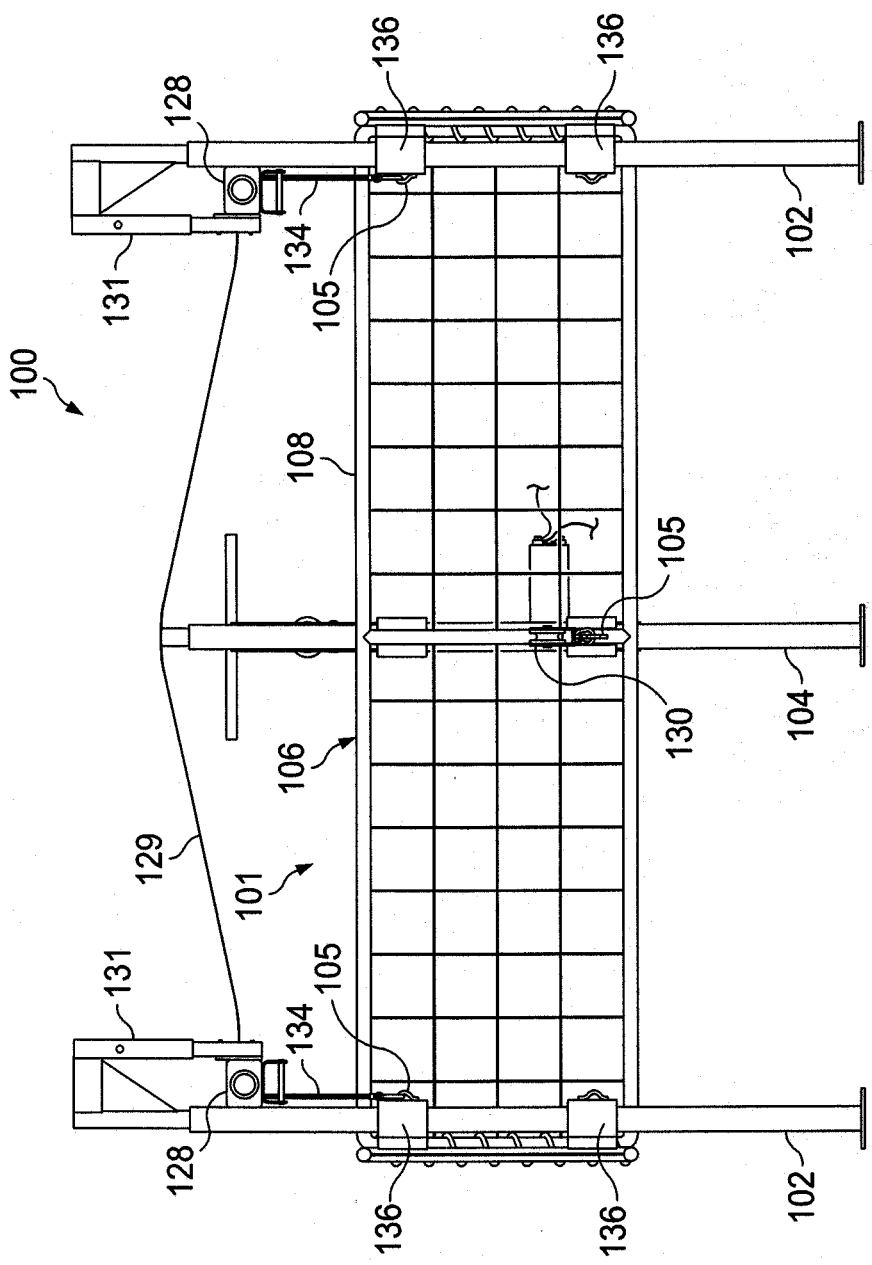
FIG. 4 is a cross-section side view of the system of FIG. 1, taken along the lines 4-4 of FIG. 2, also showing the enclosure of the system in the suspended position.

FIGS. 1, 3A, and 4 show the enclosure 101 in the suspended position wherein the bottom of each panel 106 is offset from the ground at the trap area 107 by a height (h). In one embodiment, the enclosure 101 is offset from the ground at a height (h) of 36 inches. In other embodiments, the enclosure 101 may be offset at a height (h) of 30 inches to 50 inches. In another embodiment, the offset height (h) of the enclosure 101 may be selectable based on the height or eye level of the animal that the trap is being used to catch.

For example, any height that is suitable to avoid detection by the animal would be a suitable height.

Figure 6:
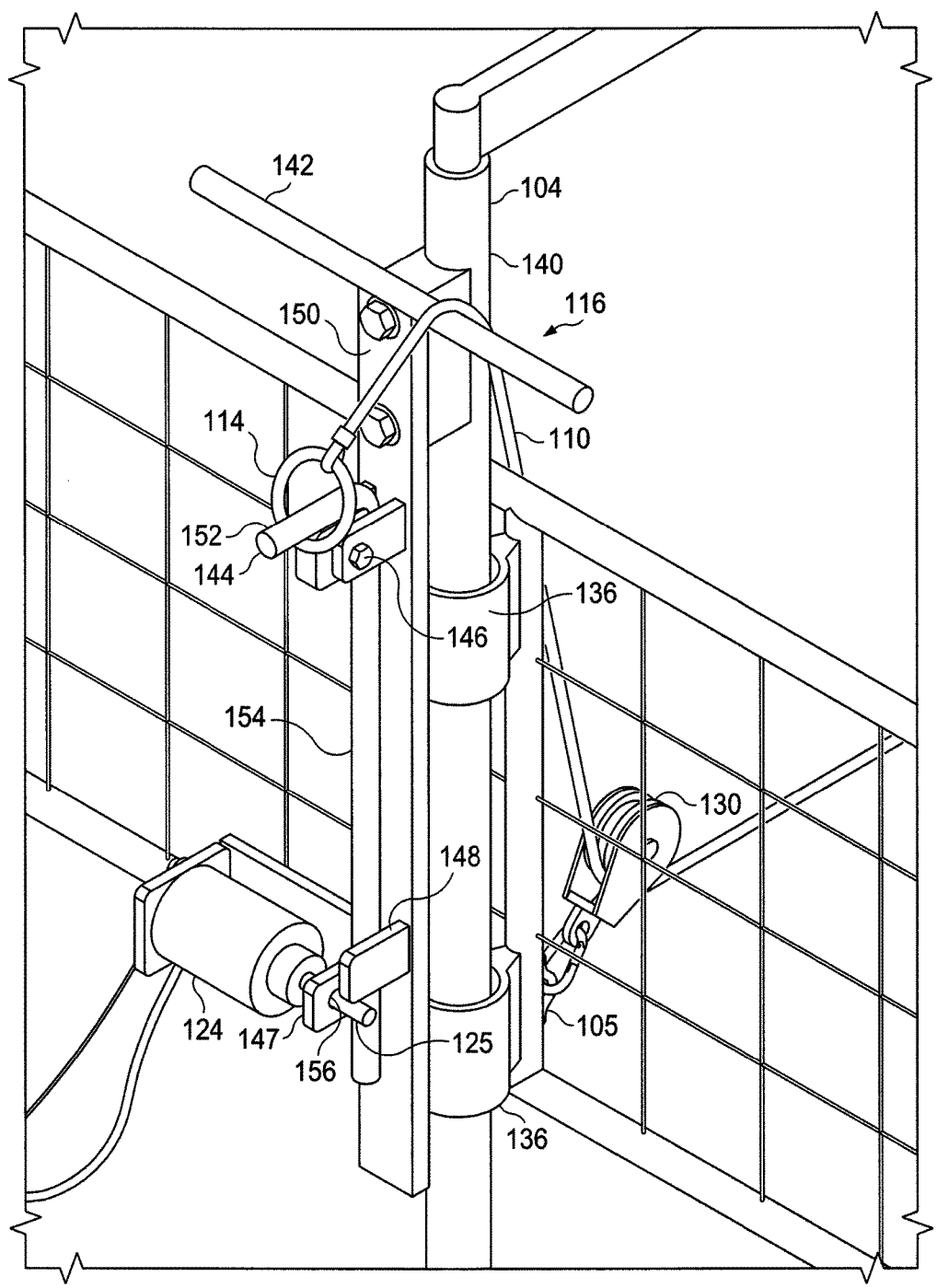
FIG. 6 is a perspective view of a portion of the system of FIG. 1 that includes a release mechanism used to actuate the system.

In the suspended position, the enclosure 101 is releasably coupled to the release mechanism 116. Referring to FIG. 6, the release mechanism 116 may be mounted to the base support 104 and coupled to a cable 110 to hold the enclosure 101 in the suspended position. To facilitate mounting the release mechanism 116 to the base support 104, the release mechanism 116 includes a release mechanism mount. The release mechanism mount may be abase plate 150 that is bolted to the base support 104 to provide a chassis for the components of the release mechanism 116. The base plate 150 may be formed from any suitable material, including without limitation 1"×2" steel channel. In one embodiment, a crossbar 142 is coupled to the top of the base plate 150 to support the cable 110 when the enclosure 101 is suspended.

As shown in FIG. 6, the release mechanism 116 includes a pivotable member 144 that is capable of rotating about a pivot support 146. The pivotable member 144 comprises an L-shaped rod formed with a pivot point and two perpendicular sections. In the embodiment of FIG. 6, the perpendicular sections include a first leg 152, and a second leg 154 that is substantially perpendicular to the first leg 152. When the enclosure 101 is in the suspended position, the second leg 154 of the pivotable member 144 extends generally parallel to the base plate 150. The second leg 154 of the pivotable member 144 is stabilized on four sides by the base plate 150, a first stabilizing plate 148 that extends from the base plate 150, a second stabilizing plate 147 that also extends from the base plate 150 and is offset from the first stabilizing plate 148, and an actuator 125 of a solenoid 124. In this configuration, the actuator 125 of the solenoid 124 constrains the pivotable member 144 from rotating about the pivot support 146. To stabilize the solenoid 124 and the actuator 125, the second stabilizing plate 147 includes an aperture 156 through which the actuator 125 of the solenoid 124 extends, although the solenoid could operate independently of an without contacting the second stabilizing plate 147. In the embodiment illustrated in FIG. 6, however, the aperture 156 supports the actuator 125 and minimizes the forces exerted on the actuator 125 that are transverse to the desired direction of motion of the actuator 125 in and out of the solenoid 124.

Referring now primarily to FIGS. 3A and 6, a releasable coupling between the enclosure 101 and release mechanism 116 includes an attachment member 114 and cable 110. Cable 110 may be a rope, a wire, or any other line that is strong enough to support the enclosure 101 yet flexible enough to be routed through pulleys or other suspension points. The attachment member 114 may be a loop in the cable 110, a latch or clip coupled to an end of the cable 110, or a ring, as shown in FIG. 6. The cable 110 may be a rope or belt made from any suitable material. To releasably couple the enclosure 101 to the release mechanism 116, a first end of the cable 110 is coupled to the first support member 102a on the opposing side of the enclosure 101 from the base support 104. The first end of the cable 110 may include a latch 132, clip, or loop of material that is coupled to an upper suspension point 111 at the top of the first support member 102a. The cable 110 is routed down from the upper suspension point 111 at the top of the first support member 102a through pulleys 130 that are attached to suspension points 105 near the bases of the first panel 106a and second panel 106b. A second end of the cable 110 includes the attachment member 114, and is routed over the crossbar 142 where the attachment member 114 is releasably coupled to the first leg 152 of the pivotable member 144 of the release mechanism 116. In the embodiment illustrated in FIG. 6, the attachment member 114 is a ring that is releasably coupled to the release mechanism by sliding the ring over the first leg 152 of the pivotable member 144. When the attachment member 114 is releasably coupled to the release mechanism, the tension in the cable 110 maintains the enclosure 101 in the suspended position by exerting an upward force on the suspension points 105 to which the pulleys 130 are coupled. The tension in the cable 110 also exerts a force on the first leg 152 of the pivotable member 144 of the release mechanism. This force generates a moment on the pivotable member about the pivot support 146 that is resisted by the actuator 125 of the solenoid 124, which constrains the pivotable member 144 from rotating.

The cable 110 may alternatively be routed over any suitable path that results in the enclosure 101 being releasably suspended by the release mechanism 116. For example, in one embodiment, the first end of the cable 110 may be attached to the second panel 106b at a suitable location, such as sleeve 136. The cable 110 may be routed through a pulley 130 located at the top of the support member 102a and over the crossbar 142 where the second end of the cable 110 releasably couples to the first leg 152 of the release mechanism 116. The second end of the cable 110 may include an attachment member 114 that releasably couples to the first leg 152, as described above. In this embodiment, a second cable is routed over the crossbar 142 from a suspension point 105 on the first panel 106a to the first leg 152. The second cable may be attached to the release mechanism in the same manner as the first cable, e.g., by releasably coupling an attachment member 114 to the first leg 152 of the release mechanism 116. In this embodiment, the enclosure 101 is suspended by both the first cable 110 and the second cable, both of which are releasably coupled to the first leg 152 of the release mechanism 116. Once coupled, the tension in the cables exerts a net force on the first leg 152 of the pivotable member 144 of the release mechanism. This net force generates a moment on the pivotable member about the pivot support 146. The moment is resisted by the actuator 125 of the solenoid 124, which constrains the pivotable member 144 from rotating until the release mechanism is released.

After the enclosure 101 is raised to the suspended position and releasably coupled to the release mechanism 116, the winch cable 134 may be decoupled from the enclosure 101 so that the enclosure is suspended by the cable 110 as described above. In this configuration, the trap system 100 is in a ready state because the enclosure 101 will quickly drop to the ground when the releasable coupling between the enclosure 101 and release mechanism 116 is released.

The releasable coupling is configured so that the release mechanism 116, when actuated, releases the attachment member 114 and second end of the cable 110. When the second end of the cable 110 is released, the cable 110 no longer resists the weight of the enclosure 101 to maintain the enclosure 101 in the suspended position. The unsuspended enclosure 101 drops rapidly to the ground, trapping and holding any animals that are within the footprint of the enclosure 101, i.e., within the trap area 107.

Figure 3B:
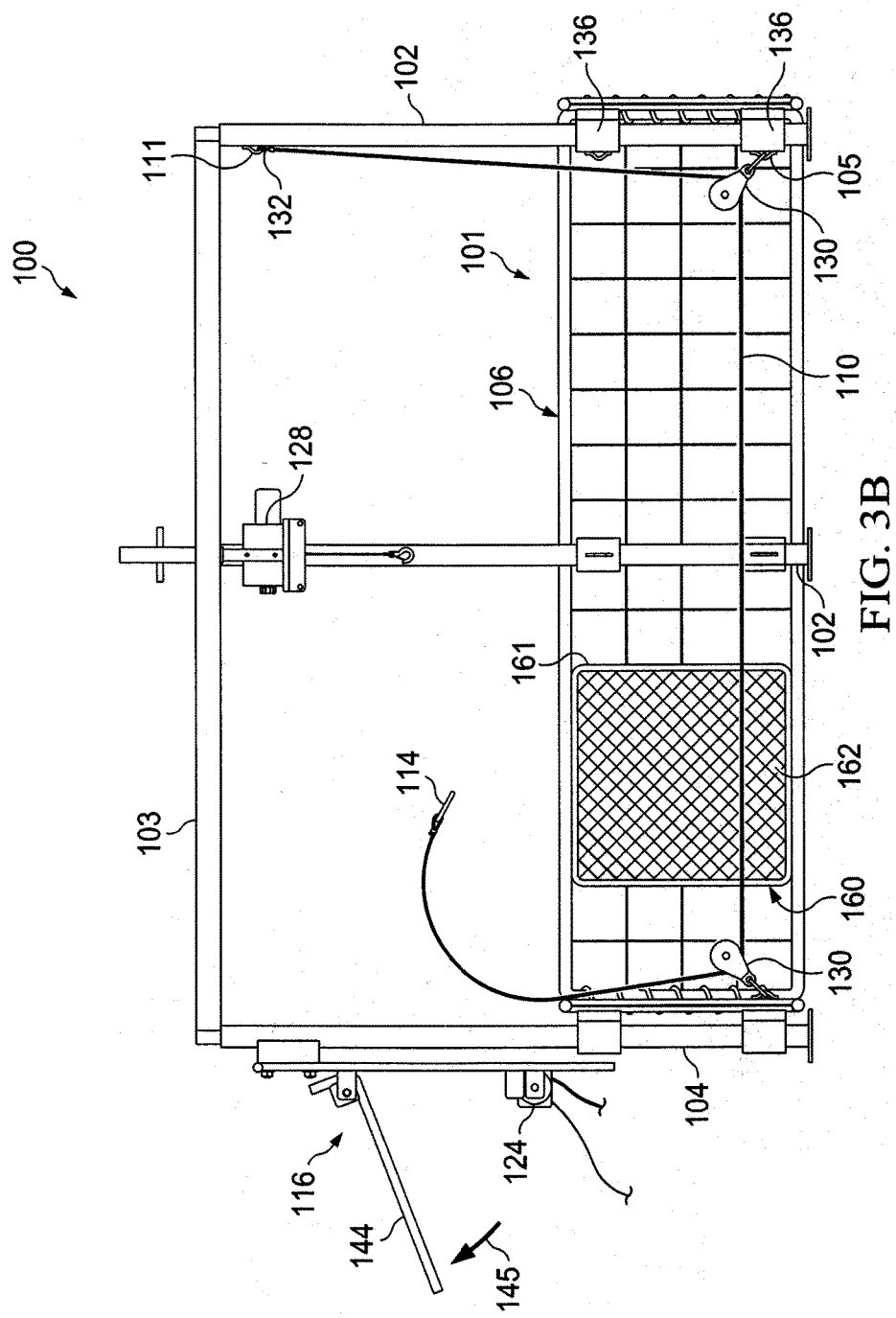
FIG. 3B is cross-sectional side view of the system of FIG. 1, taken along the lines 3A-3A of FIG. 2, showing the enclosure of the system in a lowered position.

FIGS. 3A and 3B show the trap system 100 with the enclosure 101 in the suspended state and dropped state, respectively. In the suspended position of FIG. 3A, the bottom of the enclosure 101 is maintained at a height (h) by the tension in the cable 110. As described above, the tension of the cable 110 is maintained by coupling the first end of cable 110 to the latch 132 at the top of the first support member 102a. At the second end of the cable 110, tension in the cable 110 is maintained by the releasable coupling between the attachment member 114 and the release mechanism 116.

When the release mechanism 116 is actuated, the actuator 125 of the solenoid 124 is drawn into the body of the solenoid leaving the second leg 154 of the pivotable member 144 of the release mechanism 116 unconstrained and free to rotate about the pivot support 146. The unconstrained pivotable member 144 is motivated to rotate about the pivot support 158 by the weight of the enclosure 101. The weight of the enclosure exerts a downward force on the cable 110 that is translated into an upward force on the attachment member 114 as a result of the routing of the cable 110 over the crossbar 142. The upward force on the attachment member 114 is applied to the first leg 152 of the pivotable member to generate a moment about the pivot support 158. The moment causes the unconstrained pivotable member 144 to rotate so that the first leg 152 rotates upward and the second leg 154 rotates away from the base plate 150, as indicated by the arrow 145 of FIG. 3B. The upward rotation of the first leg 152 of the pivotable member allows the attachment member 114 to slide off the first leg 152, thereby releasing the attachment member 114 and second end of the cable 110. When the attachment member 114 is released by the release mechanism 116 and the cable 110 is free to move through the pulleys 130, the enclosure 101 is released and quickly drops to the ground as shown in FIG. 3B.

Figure 7:
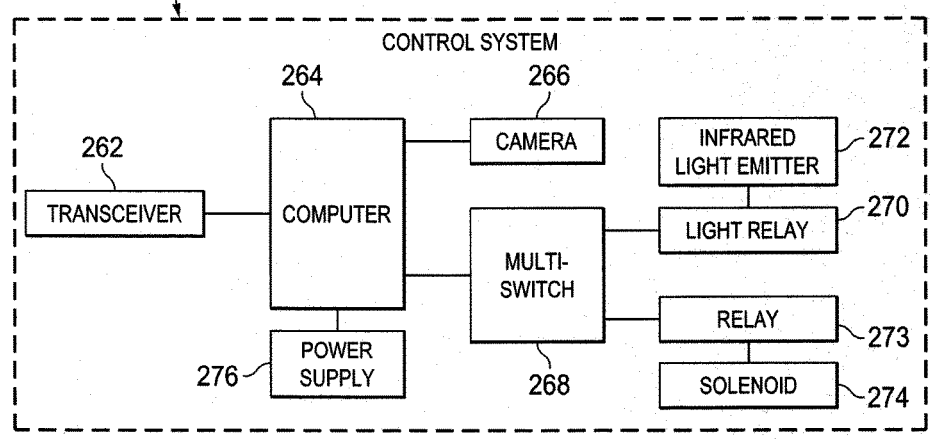
FIG. 7 is a block diagram showing an illustrative embodiment of a control system to operate the trap system of FIG. 1.

FIG. 7 shows an illustrative control system 226 that is analogous to the control system 126 of FIG. 1. The control system 226 includes a transceiver 262 to communicate with a remote user and may be, for example, a wireless Internet or network card. The transceiver 262 is coupled to a controller, e.g., computer 264, which includes an operating system such as Microsoft Windows or Linux. A power supply 276 supplies power to the control system 226 via the computer 264. The power supply 276 may be a battery, local AC source, a solar power system, a wind power system, a generator, or any other type of power system. The computer 264 is coupled to a camera 266 that monitors the trap system 100. The computer 264 is also coupled to a multi-switch 268. The multi-switch may be a USB multi-switch that in turn is connected to a light relay 270 and light emitter, which may be an infrared (IR) light emitter 272. The IR light emitter 272 illuminates the trap system 100. By remotely interfacing with the computer 264, a user may view images of the trap system 100 at any time of day from a remote site using the camera 266. The camera 266 may transmit images illuminated by daylight or infrared light from the IR light emitter 272. In one embodiment, the camera 266 may be a thermal camera. The computer 264 is also connected to a solenoid 274 via relay 273 or a series of relays. This configuration of the control system 226 allows the user to monitor the status of the trap area 107 and then send a drop signal to the computer 264 at the appropriate time, which causes the computer 264 to actuate the solenoid 274. Actuating the solenoid 274 may, in turn, actuate the solenoid 124 of trap system 100 to drop the enclosure 101.

To monitor the trap system 100, the user may access images transmitted by the computer 264 using, for example, an Internet communication protocol that allows the user to submit input to the computer 264 from a remote computer or personal computing device, such as a smart phone. In one embodiment, the user may view images or video taken by the camera 266 to determine whether animals have entered the trap system 100. The computer 264 may also generate e-mail or SMS messages that are transmitted to the user to eliminate the need to constantly monitor the trap system 100.

Since the user may view live images or video of the trap system 100, the user may quickly determine whether animals are within the trap area 107 and whether additional nearby animals are considering entering the trap area 107. The live video enables the user to wait until multiple animals have entered the trap area 107 before actuating the trap system 100. To actuate the trap system 100, the user may enter a command via a remote computer, including a personal computing device such as a smart phone. The command, i.e., a drop signal, is received at the computer 264 via the transceiver 262. In turn, the drop signal prompts the computer 264 to actuate the solenoid 274. It is noted that the solenoid 274 may be installed in the trap system 100 in place of the solenoid 124 or may be an intermediate solenoid that is coupled to the solenoid 124 to actuate the solenoid 124 and drop the enclosure 101.

In an illustrative method for trapping wild animals, four panels 106 of a trap system 100 may be separately constructed and transported to a trap site. As noted above with regard to FIG. 5, each panel 106 includes horizontal members 108, vertical members 109, and a mesh portion 141. The center of each panel 106 includes a center vertical member 139 to which sleeves 136 are mounted. At the trap site, the base support 104 is located and installed at the trap area 107. Based on the size and configuration of the panels 106, the remaining support members 102 are installed at predetermined distances from the base support 104. To install the support members, the anchored members 138 are implanted in the ground at the trap area 107, the sleeves 136 of the panels 106 are lowered over the anchored members 138, and the unanchored members 140 are installed by inserting the unanchored members 140 between the sleeves 136 and anchored members 138. The release mechanism 116 is installed to the base support 104 by, for example, bolting the release mechanism mount to the base support 104. As such, the release mechanism 116 and base support may include complementary mounting features, such as slots, thru-holes, or other mounting features. When all of the panels 106 are in place, the ends of the panels 106 are coupled together to complete the enclosure 101.

Continuing with the illustrative method, the cross-brace 103 is coupled to the top of the base support 104 and opposing support member 102. The winch 128 may be mounted atop a support member 102 or to the cross-brace 103, and the winch cable 134 may then be coupled to one or more of the panels 106. The winch 128 may be used to raise the enclosure 101 to a height (h) and the cable 110 may be coupled to the release mechanism 116, support member 102, and enclosure 101. To ready the trap system 100, the release mechanism 116 is coupled to a control system by for example, coupling an intermediate solenoid 274 of the control system 226 to the solenoid 124 of the release mechanism. Alternatively, the control system 226 may couple directly to the solenoid 124. Once readied, the trap system 100 may be remotely monitored and triggered by a user using a control system 226.

To facilitate using the trap system 100, the control system 226 may execute a process 300 for monitoring and actuating the trap system 100, as illustrated in FIG. 8. In the process 300, the camera 266 and light emitter 272 are activated to illuminate the trap area 107, and the computer 264 maintains a ready-state for transmitting an actuation signal to the solenoid 274. Once activated, the computer 264 receives a video stream of the trap area 320 from the camera 266. The video stream, or an audio-video stream, may be monitored on the computer or transmitted to a remote computer, such as a server, or a personal computing device of the user.

In an embodiment, the computer 264 includes open source or other webcam software that allows the computer and camera 266 to function as a motion detector. In such an embodiment, the computer 266 determines whether motion is determined at the trap area 322. If motion is not detected, the system continues operation in a ready state. But if motion is detected at the trap area 107, the computer 264 generates and transmits an alert message 323. The alert message may be an e-mail or SMS message 323 that is transmitted to a device of the user informing the user that motion has been detected at the trap area. In an embodiment, the message includes a picture or brief video of the trap area that enables the user to discern the source of the motion. In such an embodiment, the user is able to determine whether the type of animal that the user desires to trap has entered the trap area 107 or whether another type of animal has entered the trap area 107.

If the source of the motion is an animal that the user desires to trap, the user may log into the system to view a live video stream of the trap area 107. To receive the video stream, the user requests the video stream 330 from the computer 264 or server by, for example, logging into the server, and the video stream is transmitted to the device of the user 335. The device of the user may be any type or personal computing device, including a desktop computer, laptop computer, tablet computer, or smart phone. While transmitting the video stream, the computer 264 maintains the trap system 100 in a ready-state 340 in which the computer is ready to receive a drop-signal from the user. The drop-signal indicates a user request to actuate the trap and drop the enclosure 101 to trap any animals that might be inside the trap area 107. A user viewing the video stream may watch the video stream to determine when the desired number of animals, such as a sounder of feral hogs, has entered the trap area 107. Once the user determines that the desired number of animals have entered the trap area 107, the user transmits a drop-signal 345 to the computer 264. The computer 264 determines if a drop signal has been received 350. If the drop-signal has not been received, the trap is maintained in the ready-state 340 awaits a drop-signal. If a drop signal has been received, the computer 264 transmits an actuation signal to the solenoid 274, causing the enclosure 101 to drop and trap any animals in the trap area 107.

It is noted that while the trap system 100 is described above as including a base support 104 and three support members 102, other embodiments may include only the base support 104. In such embodiments, the enclosure 101 may be coupled to a base support that is located in the center of an enclosure without the need for additional support members. In such an embodiment, the enclosure may have a robust, rigid structure and be coupled to the single base support using one or more cables that are coupled to a release mechanism.

The steps of the methods described herein may be carried out in any suitable order, or simultaneously where appropriate. Where appropriate, aspects of any of the embodiments described above may be combined with aspects of any of the other embodiments described to form further examples having comparable or different properties and addressing the same or different problems.

It will be understood that the above description of preferred embodiments is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

We claim:

1. A method for capturing animals within a trap area, the method comprising:
   suspending a rigid enclosure, which defines an enclosure perimeter, above the trap area;
   monitoring at least the trap area for animal activity;
   notifying a user at a remote location relative to the trap area in response to detected activity in at least the trap area;
   activating an image capture system;
   transmitting images of the trap area and a contiguous secondary area surrounding the trap area to provide to the user at the remote location an indication of a number of animal in the trapped area; and
   transmitting a drop signal from the remote location in response to an instruction from the user with an electronic device to drop the enclosure, wherein when dropped, the enclosure perimeter segregates and encompasses the trap area from the secondary area.

2. The method of claim 1, further comprising after the step of transmitting images: viewing the secondary area and animals within the trap area and the secondary area captured by using a thermal camera.

3. The method of claim 1, wherein transmitting a drop signal further comprises: transmitting the drop signal from the remote location using a telephone.

4. The method of claim 1, wherein transmitting a drop signal further comprises: transmitting the drop signal from the remote location wirelessly.

5. The method of claim 1, wherein the step of transmitting images includes transmitting live images of the trap area and the secondary area.

6. The method of claim 1, wherein monitoring at least the trap area for animal activity further comprises: monitoring the trap area and at least a portion of the secondary area for animal activity using a telephone.

7. A method for a user at a remote location to capture animals at a trap area, the method comprising:
   providing a rigid enclosure formed of at least one vertical panel, the rigid enclosure being movable from a suspended position above the trap area, having a perimeter, to a lowered position encompassing the trap area, further including:
   a release mechanism, positioned adjacent to a side of the at least one vertical panel, operatively coupled to the rigid enclosure and configured to hold the rigid enclosure in the suspended position when the release mechanism is engaged, and to release the rigid enclosure when the release mechanism is non-engaged,
   wherein when the release mechanism transitions between engaged and non-engaged, the rigid enclosure is released and travels from the suspended position to the lowered position,
   wherein the rigid enclosure defines an enclosure perimeter,
   raising the rigid enclosure above the trap area, wherein animals can freely transverse the trap area perimeter and move beneath the rigid enclosure;
   engaging the release mechanism to hold the rigid enclosure in the suspended position;

delivering images of the trap area to the user to enable the user to determine a number of animal in the trap area from the remote location;

transmitting a user-directed drop signal from the remote location using an electronic device to operatively transition the release mechanism from engaged to non-engaged; and dropping the rigid enclosure to the lowered position, wherein when the rigid enclosure is in the lowered position the rigid enclosure encompasses the trap area, to confine animals within the trap area.

8. The method of claim 7, further comprising: providing a stationary structure that supports a sliding motion of the rigid enclosure and supports and guides the rigid enclosure through movement from the suspended position to the lowered position.

9. The method of claim 7, further comprising: baiting the trap area.

10. The method of claim 7, wherein delivering images comprises: transmitting video images of the trap area to the user at the remote location.

11. The method of claim 10, wherein the video images of the trap area, the animal activity, the transmitted drop signal, and the dropping of the rigid enclosure are substantially contemporaneous.

12. The method of claim 10, wherein transmitting the video images of the trap area comprises: transmitting images of a contiguous secondary area surrounding the trap area.

13. The method of claim 12, wherein transmitting images of the trap area and the secondary area further comprises: capturing video images using a camera.

14. The method of claim 13, further comprising: detecting animal activity within the trap area, and activating the camera, wherein the activating is carried out prior to said detecting.

15. The method of claim 7, wherein transmitting a user-directed drop signal further comprises: transmitting the user-directed drop signal from a telephone.

16. The method of claim 7, wherein delivering images of the trap area to the user includes delivering the images to a telephone.

17. A method for a user to capture animals, the method comprising:
    suspending a rigid enclosure, which defines an enclosure perimeter, above a trap area;
    transmitting live video images of the trap area and a contiguous secondary area immediately surrounding the trap area to the user at a remote location to provide an indication of a number of animal in the trapped area;
    monitoring animal activity in the trap area and the secondary area from the remote location;
    transmitting a user-directed drop signal, from the remote location, to drop the enclosure; and
    dropping the rigid enclosure, wherein when dropped, the enclosure perimeter encompasses and segregates the trap area from the secondary area to capture and contain animals within the trap area.

18. The method of claim 17, wherein the video images of the trap area and secondary area, the animal activity, the transmitted drop signal, and the dropping of the rigid enclosure are substantially contemporaneous.

19. The method of claim 17, wherein transmitting video images of the trap area and the secondary area further comprises:
    capturing the video images using a camera.

20. The method of claim 19, further comprising: detecting animal activity within the trap area, and transmitting an alert message, wherein transmitting the alert message is carried out subsequent to said detecting.

21. The method of claim 17, wherein transmitting a user-directed drop signal further comprises:
    transmitting the user-directed drop signal from a telephone.

22. The method of claim 17, wherein transmitting a user-directed drop signal further comprises: transmitting the user-directed drop signal wirelessly.

23. The method of claim 17, wherein monitoring animal activity in the trap area and the secondary area further comprises: monitoring animal activity in the trap area and the secondary area using a telephone.

* * * * *